July 28, 1925.

O. H. LUDEMAN 1,547,429

CONDENSATE CONTROLLING DEVICE FOR VAPOROUS FLUIDS UNDER PRESSURE

Filed May 28, 1924

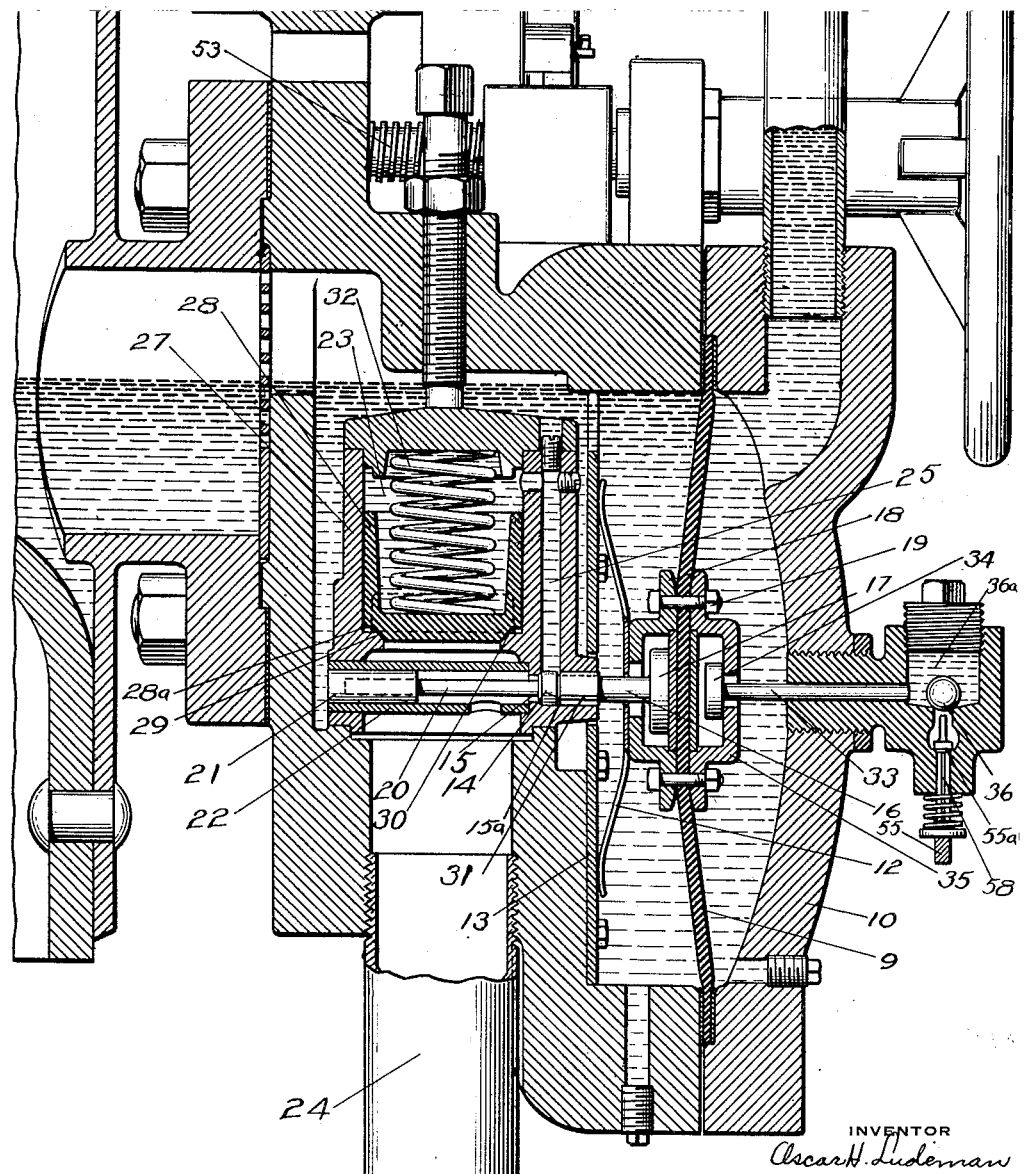

July 28, 1925.
O. H. LUDEMAN
1,547,429
CONDENSATE CONTROLLING DEVICE FOR VAPOROUS FLUIDS UNDER PRESSURE
Filed May 28, 1924
5 Sheets-Sheet 3
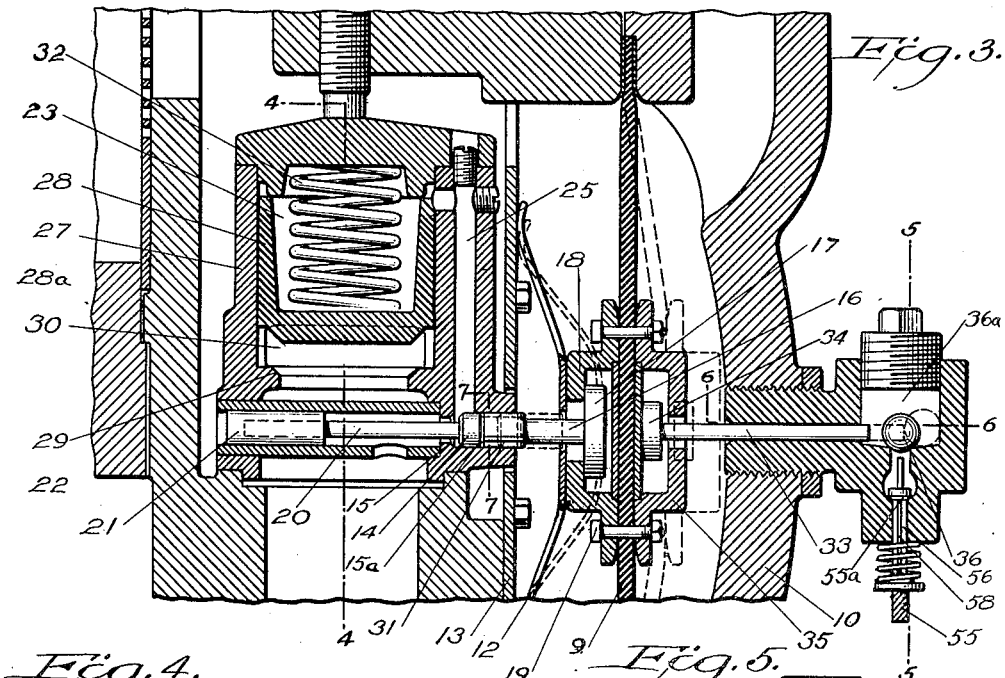
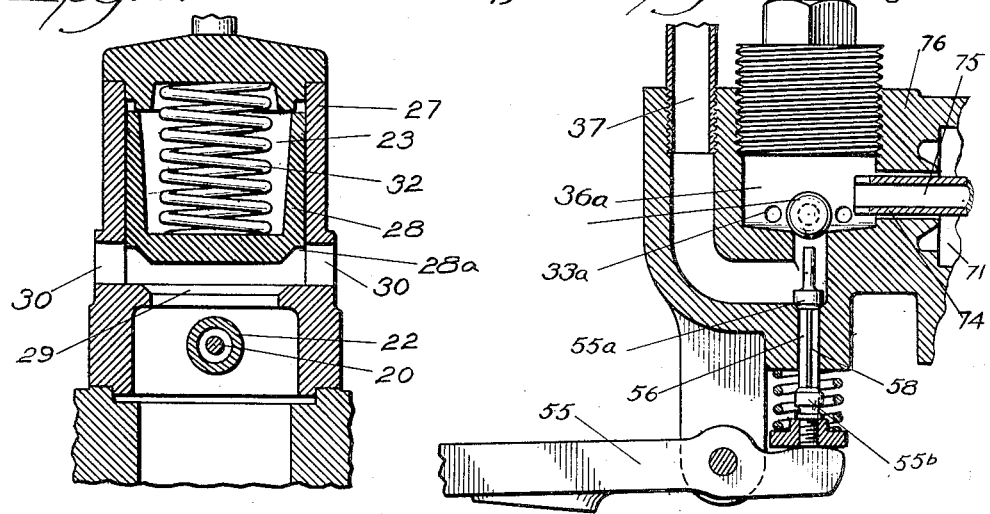
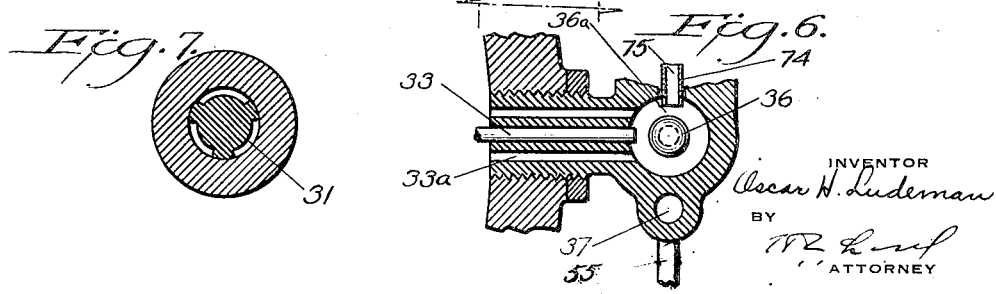
INVENTOR
Oscar H. Ludeman
BY
ATTORNEY July 28, 1925.
O. H. LUDEMAN
1,547,429
CONDENSATE CONTROLLING DEVICE FOR VAPOROUS FLUIDS UNDER PRESSURE
Filed May 28, 1924
5 Sheets-Sheet 4
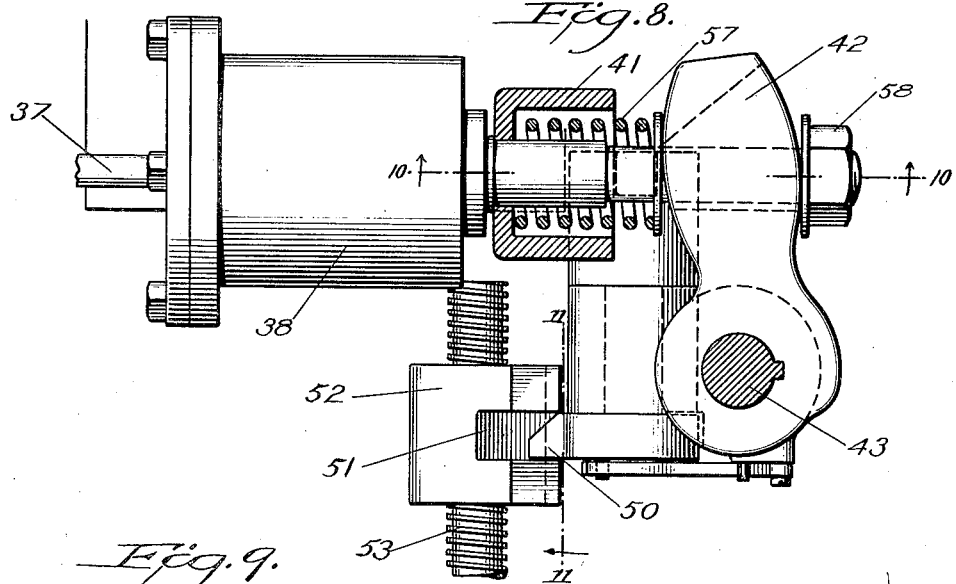
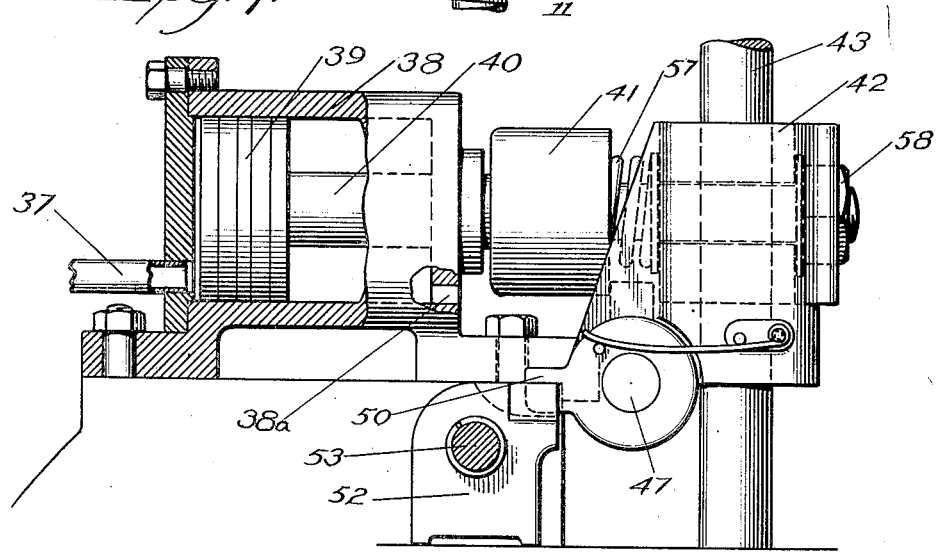
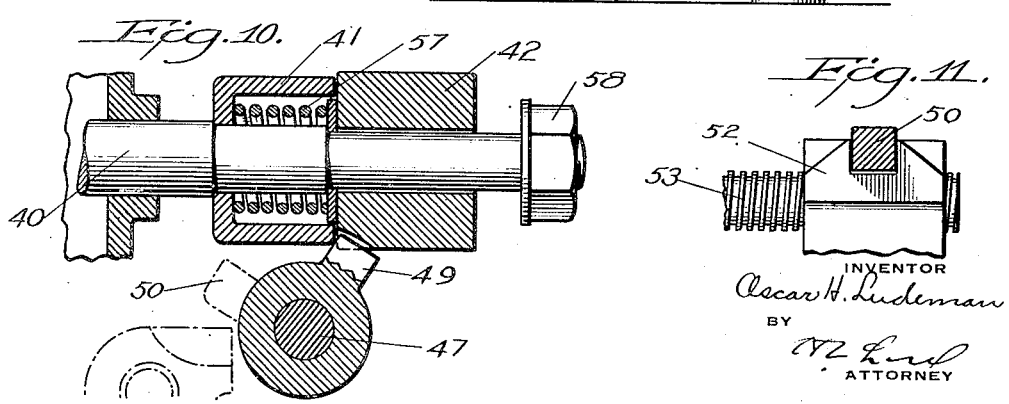
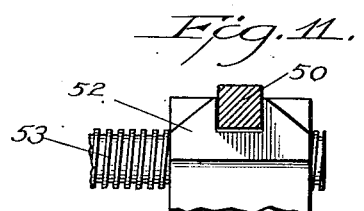
INVENTOR
Oscar H. Ludeman
BY
ATTORNEY July 28, 1925.　　　　　　　　　　　　　　　　　　　1,547,429
O. H. LUDEMAN
CONDENSATE CONTROLLING DEVICE FOR VAPOROUS FLUIDS UNDER PRESSURE
Filed May 28, 1924　　　　　5 Sheets-Sheet 5
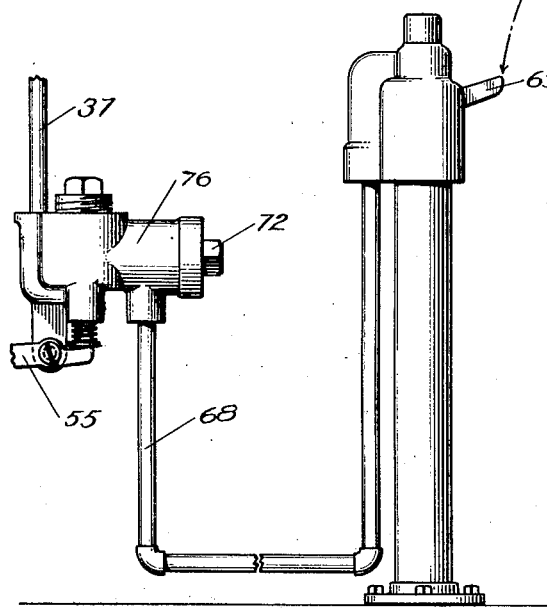
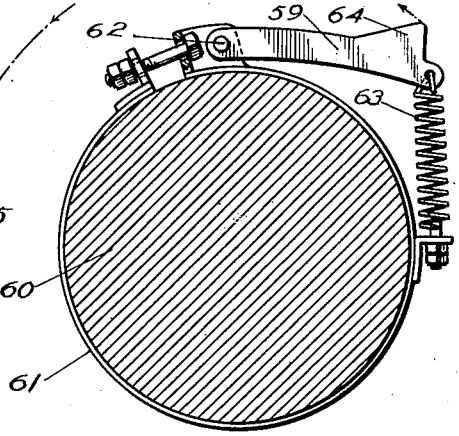
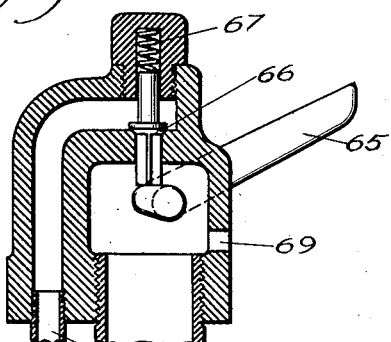
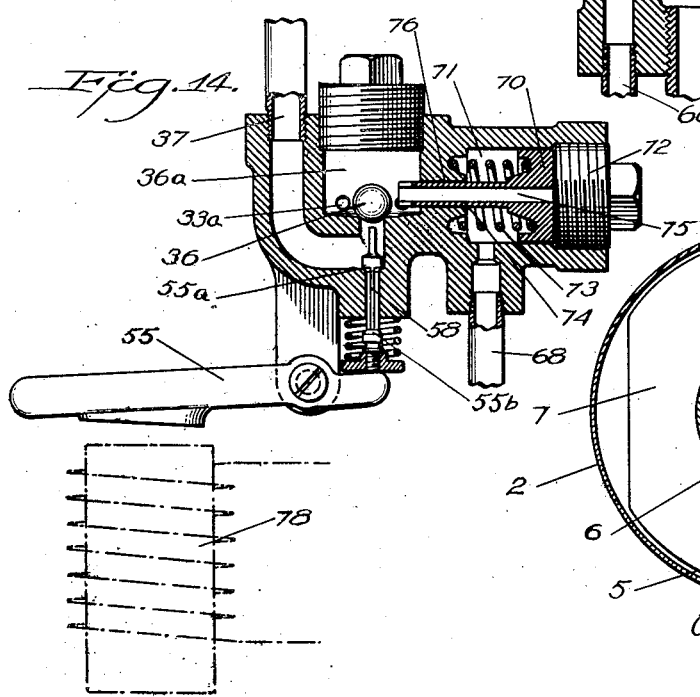
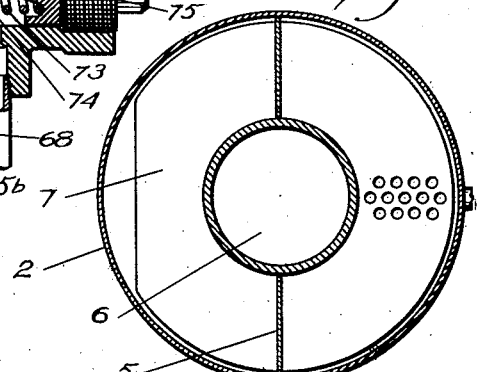

Patented July 28, 1925.

1,547,429

UNITED STATES PATENT OFFICE.

OSCAR H. LUDEMAN, OF GLEN RIDGE, NEW JERSEY, ASSIGNOR OF ONE-HALF TO EDWIN H. LUDEMAN, OF BROOKLYN, NEW YORK.

CONDENSATE-CONTROLLING DEVICE FOR VAPOROUS FLUIDS UNDER PRESSURE.

Application filed May 28, 1924. Serial No. 716,484.

*To all whom it may concern:*

Be it known that I, OSCAR H. LUDEMAN, a citizen of the United States, residing at Glen Ridge, in the county of Essex and State of New Jersey, have invented new and useful Improvements in a Condensate-Controlling Device for Vaporous Fluids Under Pressure, of which the following is a specification.

The invention is particularly applicable to steam separators and is so exemplified in the following specification.

With such devices the use of a pressure responsive element, such as a diaphragm has very great advantages over the controlling devices now generally employed. The use of such a pressure responsive device, however, is made difficult by the condensate which accumulates not only on the variable side of the pressure responsive member but also on what should be the constant pressure side. In the present invention this difficulty is obviated and a constant pressure maintained on one side of the member by extending its connection to a point above the member and arranging for an overflow from said connection to the discharge or variable side of the trap. Under these conditions a constant liquid column is maintained in the connection leading to the constant pressure side of the member and consequently an approximately constant pressure is maintained.

It is also desirable with such devices to operate a shut-off valve for cutting off the steam in the line if there should be an abnormal flooding of the trap so as to prevent the carrying over liquid to the engine or device connected with the line and with the resultant damage and injury that will ordinarily ensue. This is provided in the present device and can be more readily provided with a pressure responsive device than with such devices as are common. It is also desirable to operate the discharge valve from the trap by the action of the steam pressure controlling the same from the pressure responsive member through a pilot valve in that this relieves the load on the pressure responsive device and permits the use of a positively and readily actuated discharge valve.

It is also desirable to actuate the shut-off valve through the steam pressure both because of relieving the load on the pressure responsive member and also because it permits of placing the shut-off valve at a point remote from the pressure responsive member and controlling said shut off valve through a pilot valve directly responsive to the movement of the pressure responsive member.

The use of the pressure actuated valves simplifies the use of a single instrumentality such as a pressure responsive device for actuating them and this is accomplished in the present device.

With the above and other objects in view, my invention consists in the parts, improvements and combinations more fully pointed out hereinafter.

Referring now to the drawings; illustrating one embodiment of the invention:—

Figure 2 is a vertical cross-section through the discharge valve mechanism and the diaphragm.

Figure 3 is a vertical cross-section through the discharge valve mechanism and the diaphragm, showing the parts in the position for discharging the separated water.

Figure 4 is a vertical cross-section on line 4—4 of Figure 3.

Figure 5 is a vertical cross-section on line 5—5 of Figure 4, showing a means for operating the controlling valve for the main stop valve, by hand.

Figure 6 is a transverse sectional view through the controlling chamber illustrated in Figure 5.

Figure 7 is a vertical cross-section on line 7—7 of Figure 3.

Figure 8 is a view partly in transverse section of the mechanism for operating the main stop valve.

Figure 9 is a sectional elevation, with parts broken away, of the mechanism shown in Figure 8.

Figure 10 is a sectional detail on line 10—10 of Figure 8.

Figure 11 is a sectional detail on line 11—11 of Figure 8 illustrating a portion of the mechanism for opening the stop valve by hand.

Figure 12 is a transverse section on line 12—12 of Figure 1.

Figure 13 illustrates in elevation and partly in section a means for controlling the stop valve if the engine speed becomes too high.

Figure 14 is a vertical cross-section through the valve controlling mechanism illustrated in Figure 13, showing a way of controlling by means of a magnet.

Figure 15 is a sectional detail of a part of the mechanism shown in Figure 13.

Figure 1:
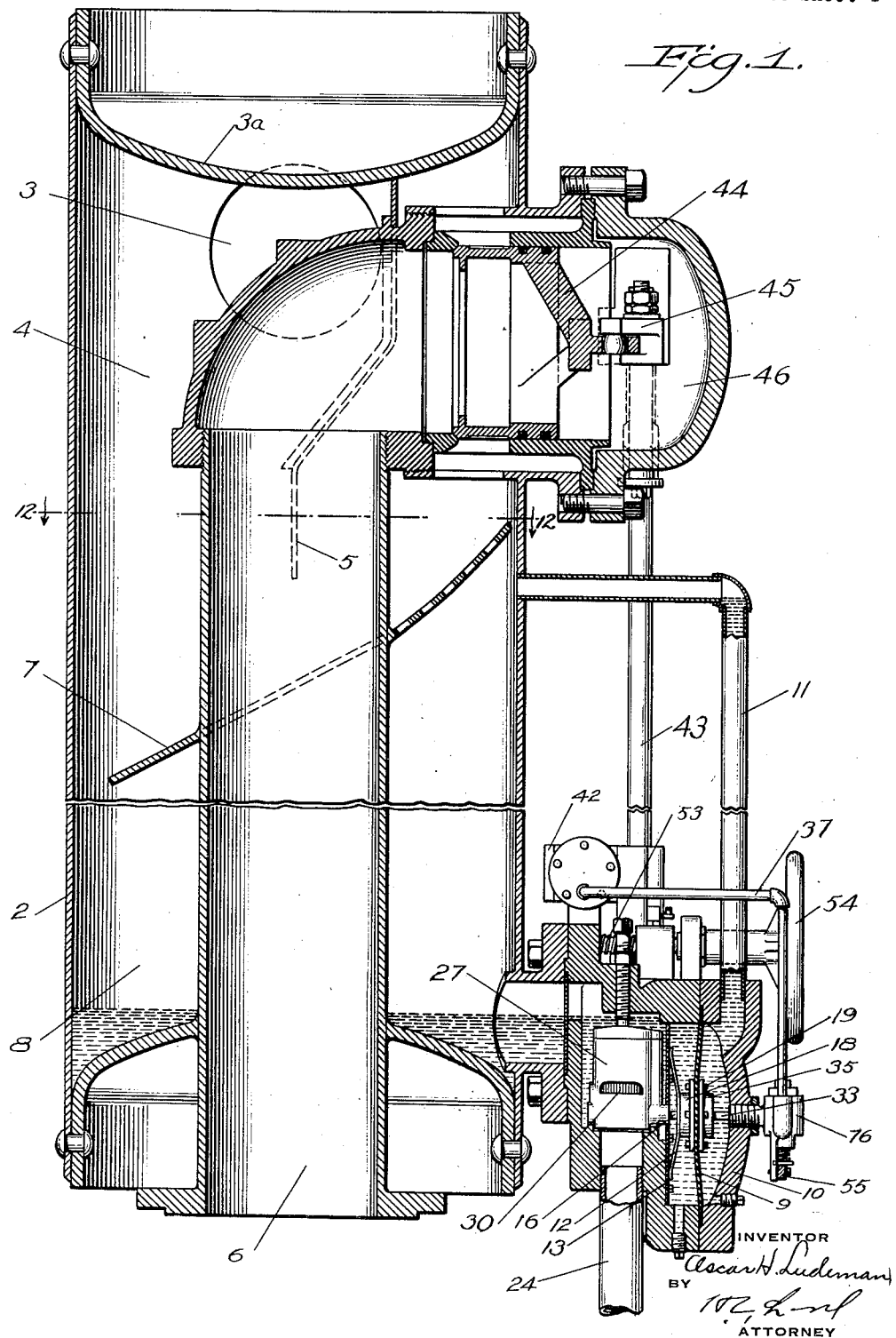
Figure 1 is a vertical cross-section through the separator.

In the drawings, the shell of the separator is indicated by the numeral 2, the steam inlet is shown at 3, the exact position of which may be varied, the top of the separator being formed by the head 3ª. The steam passes through the steam inlet 3 downwards into space 4, passing around the baffle or deflector plate 5, the baffle extending across from one side of the shell to the outlet pipe 6 and from the opposite side of the pipe 6 to the other side of the shell, this construction being shown in Figures 1 and 12. As the steam changes its direction around the baffle 5, the entrained or accompanying moisture or water continues downward past, along and through the splash plate 7 to the lower portion or reservoir 8 where after a certain amount is accumulated it is discharged from the separator.

Means are provided for discharging the separated and accumulated water at intervals, the said means being actuated by the pressure of the steam within the separator and being controlled by a diaphragm subjected to water pressure on both sides, as well as to a spring or weight on one side. The diaphragm is automatically actuated so as to control the discharging means and to release it when the separated moisture has accumulated a predetermined amount. In the embodiment of the invention illustrated, a flexible diaphragm 9 is provided which may be made of rubber or other material, the diaphragm being subjected to hydrostatic pressure on both sides. On the inner side, the hydrostatic pressure is due to the accumulated water within the separator, as indicated diagrammatically in Figure 1. On the outer side, water fills the space between the head 10 of the diaphragm chamber and the diaphragm, water of condensation being supplied to the chamber by pipe 11 communicating with the interior of the separator. This water is formed by condensing steam in the pipe, the pipe being exposed to the atmosphere and, therefore, cooler temperature. As shown the water fills the pipe supplying a substantially constant head for the outer side of the diaphragm. A spring 12, or a weight, urges the diaphragm outwardly, the spring pressing against the plate 13. Means are provided whereby the movement of the diaphragm actuates a controlling valve which in turn controls the operation of the discharge valve. The valve 14 operates between the ports 15 and 15ª. The valve is carried by a rod 16. The rod has a head 17 which is engaged by a cap 18, the engagement preferably permitting some relative movement. The cap is secured to the diaphragm by bolts 19. A rod 20 extends forwardly from the valve to a plug 21 operating in a cylinder 22, the plug being subjected to separator pressure, thus balancing the pressure on the valve 14 in order to minimize the force necessary to actuate the valve. A valve chamber 23 and discharge pipe 24 are placed in communication by way of the valve 14 through a passage 25. With the valve 14 closed on the seat 15 and open as to the seat 15ª the passage 25 and consequently the chamber 23 is in communication with the trap chamber and consequently is subjected to steam pressure. When the valve 14 is closed on the seat 15ª and open as to the seat 15 the passage 25 is put into communication with the atmosphere by way of the discharge pipe 24 so that the chamber 23 is subjected to atmospheric pressure. A cylinder 27 extends from the valve chamber. A valve 28 is mounted in this cylindrical portion and operates on a seat 29. The valve controls the opening to the discharge pipe 24 by way of ports 30 leading to the trap. The valve has an annular shoulder 28ª outside the seat which is subjected to trap pressure so that when the upper part of the valve is relieved of trap pressure through the opening of the valve 14 the valve is immediately opened by reason of the pressure beneath the valve against the spring 32. When the controlling valve 14 is closed on the seat 15 as heretofore described fluid from the trap under pressure is carried to the chamber 23 thus making a preponderance of pressure above the valve and closing the same. In order to guide the valve and facilitate the communication between the trap and the seat 15ª the stem is provided with longitudinal slots 31 as shown in Figs. 3 and 7.

The operation of this device is readily apparent. The hydrostatic head in the pipe 11 at the outside of the diaphragm is overcome by the hydrostatic head within the trap when it reaches the desired maximum height, the hydrostatic head within the trap being supplemented to accomplish this purpose by the spring 12. Under these conditions the diaphragm is moved outwardly and the valve 14 reversed and the operation of the valve above described takes place discharging the trap. As soon as the level on the trap side of the diaphragm has reached the desired minimum the hydrostatic head in the pipe 11 acting on the diaphragm moves it inwardly and again reverses the valve 14, thus accomplishing the closing of the discharge valve in the manner above described. The operation of discharging the water takes place, therefore, as often as it accumulates in the separator.

Means are provided for shutting off the supply of steam in the line when there is a more rapid accumulation of liquid in the separator than can be taken care of with the normal discharge. When, under such conditions, the level of liquid rises above the ordinary maximum a greater pressure is exerted outwardly against the diaphragm 9 than under the normal operation of the device. This abnormal pressure is utilized to control the closing of the shut-off valve.

In the embodiment of the invention illustrated a rod 33 has its head 34 engaged by a cap 35, some play being permitted. The cap is secured to the diaphragm by the bolts 19. The rod 33 operates against a ball valve 36 arranged in a valve chamber 36$^a$, said chamber being connected with the separator by means of passages 33$^a$ (see Figs. 5 and 6). When the valve 36 is forced from its seat through the action of the rod 33 as impelled by the diaphragm communication is established between the separator past the valve 36 with a passage 37. This actuates the means for closing the shut off valve for the steam. A locking mechanism for holding the shut off valve open is also provided as well as means for opening the valve by hand. These various means will now be described.

In the embodiment of the invention illustrated the means for closing the shut off valve includes a piston 39 in the working cylinder 38, the pipe 37 leading to the outer end of this cylinder and a rod 40 is secured to the piston. The rod 40 carries a collar 41 and as the piston rod moves outward the collar 41 first unlocks the lock for the shut off valve and then by striking arm 42 on shut off valve stem 43, actuates the shut off valve 44, connected to the valve stem by rocker 45. A drain hole 38$^a$ is provided in cylinder 38 to avoid back pressure when the piston moves outwardly and permits the escape of any water that may leak past the piston. It will be observed in Figure 1 that the valve stem 43 extends upwards and into steam chest 46 and that when valve stem 43 is rocked as just described it closes the valve 44 shutting off the flow of steam or entrained water through the outlet pipe 6. The locking mechanism for locking the shut off valve open comprises a rock shaft 47 carried by a housing 48 mounted upon the valve stem 43, so as to rock and turn with the valve stem. The housing is formed with rock arm 42.

One end of the rock shaft 47 is provided with an arm 49 with which the collar 41 enages to rock it; the other end of the rock shaft carries a toe 50 which is adapted to enter a notch or recess 51 in the sliding block 52.

With the block 52 in the position shown, the toe 50 engages the notch 51, thus preventing the rocking of the valve stem 43. When the piston moves outwardly, however, the collar 41 first strikes the arm 49 which rocks the shaft 47, thus raising the toe 50 out of the notch and freeing the valve stem 43. This permits the stem to be turned by further movement of the collar 41 which thereupon strikes the arm 42, and rocks the stem 43 to close the shut off valve.

The means for reopening the shut off valve by hand will now be described. This occurs after the valve has been closed by means of the piston 39. A screw 53 engages and passes through the block 52 and is provided with a handwheel 54, so that on turning the handwheel, the block is moved back and forth. The screw block is thus brought with its notch into the point of registering with the toe 50. Upon pressing down upon the handle 55 (Fig. 5) part way, the water in the cylinder 38 and pipe 37 is allowed to drain out past the valve 55$^a$ through the passages 56. This permits return movement of the piston and the spring 57 (Figs. 8 and 10) will immediately upon the described release of the water from the cylinder 38, move the piston with its collar 41 over to the limit of the return of the washer and nut 58 (Fig. 8) against the arm 42. It will be noted that the emergency closing piston 39, when the main shut off valve 44 is opened and closed by hand by means of the wheel 54, screw 53 and screw block 52 is connected with the hand operating mechanism and moves with it. This avoids danger of sticking that might occur if the emergency piston 39 were not so interconnected and moved only at long or infrequent intervals.

Means are provided for quick closing of the shut off valve by actuating a hand lever or by overspeeding of the engine, turbine or other prime mover to which steam is being supplied via shut off valve 44 and outlet pipe 6. In Fig. 5, a quick hand closing device is illustrated whereby by pressing downwards on the handle 55, the valve 55$^a$ is raised by the rod 58 and the valve 55$^b$ closed and pressure is admitted to the cylinder 38 moving the emergency piston 39 and closing the main shut off valve 44 in the manner above described. Likewise, in the event of overspeeding of the engine to which steam is supplied through the valve 44, the speed limit governor 59 (Fig. 13) is attached to the main engine shaft 60 as by a band or strap 61, one end of the arm 59 of the governor being pivoted at 62 to the strap and being held in by a spring 63. The face 64 of the arm 59 will strike the toe 65 when the speed overcomes the tension of the spring and move the toe downward (see Fig. 15), thus raising the valve 66 against a spring 67. The valve thus releases pressure from pipe line 68 to atmosphere at port 69. This reduction of pressure will operate the ball valve 36 and the shut off valve 44 will thus be closed. To actuate the ball valve by reduction in pressure, the piston 70 in piston chamber 71 is employed. The piston chamber is closed by screw plug 72. A spring 73 returns the piston. The piston and its stem 74 are perforated at 75. The stem 74 fits loosely in the drilled guide in casing 76. Steam and water pressure will thus pass into stem 74 and behind piston 70 and also around stem 74 and upon and in front of piston 70. With piston 70 thus normally in steam and water pressure balance the compression spring 73 keeps the piston 70 against the cylinder head formed by screw plug 72, as shown. However, with the overspeed of the engine, tripping of valve 66 releasing pressure from line 68 and chamber 71, the piston 70 due to the steam and water pressure (on right side of Fig. 14) being maintained through hollow stem 74, immediately moves to the left pushing valve 36 from its seat admitting water and pressure to the pipe 37 to piston 39 thus closing the main stop valve 44 in the manner already described. Means are also provided as illustrated in Fig. 14 for accomplishing the closing of the stop valve by electric means, from remote points or via the governor on the engine or turbine. The electric magnet 78 is thus energized drawing down by magnetic pull the handle or lever 55 raising valve 36 admitting pressure to closing cylinder 38, moving piston 39 and closing shut off valve 44 in the manner already described.

It will be noted that the diaphragm is protected by the liquid from the direct action of the steam so that such material as rubber may be used to advantage.

What is claimed as new is:—

1. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining an approximately constant hydrostatic head; and a valve actuated by said member.

2. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining an approximately constant hydrostatic head; and a condensate valve actuated by said member.

3. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining an approximately constant hydrostatic head; and a fluid shut-off valve actuated by said member.

4. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a condensate discharge valve actuated by said member; and a fluid shut-off valve actuated by said member.

5. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately contant relatively to said fluid pressure; a condensate discharge valve actuated by said member; and a fluid shut-off valve actuated by said member, said valves being actuated in response to different heads of the condensate.

6. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining an approximately constant hydrostatic head; a fluid shut-off valve actuated by said member; and a manually operated means for actuating the shut-off valve.

7. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining an approximately constant hydrostatic head; a fluid shut-off valve actuated by said member; and a manually actuated means operable from a distance controlling said shut-off valve.

8. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated valve; and a pilot valve actuated by said member and controlling said fluid actuated valve.

9. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated condensate discharge valve; and a pilot valve actuated by said member and controlling said fluid actuated condensate discharge valve.

10. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated shut-off valve; and a pilot valve actuated by said member and controlling said fluid actuated shut off valve.

11. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated condensate discharge valve; a fluid actuated shut off valve; and pilot valve mechanism actuated by said member controlling said valves.

12. In a condensate controlling device for vaporous fluids under pressure, the combination of a pressure responsive member; a connection subjecting one side of the member to the fluid pressure and a varying head of condensate from said fluid pressure to control the movement of said member; a connection subjecting the other side of said member to the fluid pressure while maintaining an approximately constant liquid head on said member; and a valve actuated by said member.

13. In a condensate controlling device for vaporous fluids under pressure, the combination of a pressure responsive member; a connection subjecting one side of the member to the fluid pressure and a varying head of condensate from said fluid pressure to control the movement of said member; a connection subjecting the other side of said member to the fluid pressure while maintaining an approximately constant liquid head on said member; and a condensate discharge valve actuated by said member.

14. In a condensate controlling device for vaporous fluids under pressure, the combination of a pressure responsive member; a connection subjecting one side of the member to the fluid pressure and a varying head of condensate from said fluid pressure to control the movement of said member; a connection subjecting the other side of said member to the fluid pressure while maintaining an approximately constant liquid head on said member; and a fluid shut-off valve actuated by said member.

15. In a condensate controlling device for vaporous fluids under pressure, the combination of a pressure responsive member; a connection subjecting one side of the member to the fluid pressure and a varying head of condensate from said fluid pressure to control the movement of said member; a condensate discharge valve actuated by the member; and a connection subjecting the opposite side of the member to the fluid pressure and a liquid head maintained approximately constant by an overflow to the liquid leading to the condensate discharge.

16. In a condensate controlling device for vaporous fluids under pressure, the combination of a pressure responsive member; a connection subjecting one side of the member to the fluid pressure and a varying head of condensate from said fluid pressure to control the movement of said member; a condensate discharge valve; a pilot valve actuated by said member controlling said condensate discharge valve; and a connection subjecting the opposite side of said member to the fluid pressure and a liquid head maintained approximately constant.

17. In a condensate controlling device for vaporous fluids under pressure, the combination of a pressure responsive member; a connection subjecting one side of the member to the fluid pressure and a varying head of condensate from said fluid pressure to control the movement of said member; a condensate discharge valve; a pilot valve actuated by said member controlling said condensate discharge valve; and a connection subjecting the opposite side of said member to the fluid pressure and a liquid head maintained approximately constant by overflow from the liquid condensate controlled by the discharge valve.

18. In a condensate controlling device for vaporous fluids under pressure, the combination of a pressure responsive member; a connection subjecting one side of the member to the fluid pressure and a varying head of condensate from said fluid pressure to control the movement of said member; a condensate discharge valve; a pilot valve actuated by said member controlling said condensate discharge valve; a connection subjecting the opposite side of said member to the fluid pressure and a liquid head maintained approximately constant by overflow from the liquid condensate controlled by the discharge valve; a shut off valve; and a pilot valve actuated by said member controlling said shut off valve.

19. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated shut-off valve mechanism controlled by said member comprising a motor actuated by a reciprocating rod, a shut-off valve; a rock shaft controlling the shut-off valve; an arm on the rock shaft actuated by the motor; and a screw for re-setting the shut off valve.

20. In a condensate controlling device for vaporous fluids under pressure, the combination of a pressure responsive member; means subjecting one side of said member to the fluid pressure and a varying head of condensate from said fluid pressure to control the movement of the member; means subjecting the other side of the member to the fluid pressure while maintaining the pressure approximately constant relatively to said fluid pressure; a fluid actuated shut-off valve mechanism controlled by said member comprising a motor actuated by a reciprocating rod; a shut-off valve; a rock shaft controlling the shut-off valve; an arm on the rock shaft actuated by the motor; a catch for locking the shut-off valve in open position; means actuated by the motor for tripping the catch, and a screw operating on the catch for re-setting the valve.

21. In a condensate controlling device for vaporous fluids under pressure, the combination of a discharge valve; a fluid actuated shut-off valve; a member responsive to various levels of accumulated condensate controlling said discharge valve; and a pilot valve controlled by said member and controlling said shut-off valve.

22. In a condensate controlling device for vaporous fluids under pressure, the combination of a discharge valve; a fluid actuated shut-off valve; a fluid actuated member responsive to various levels of accumulated condensate controlling said discharge valve; and a pilot valve controlled by said member and controlling said shut-off valve.

23. In a condensate controlling device for vaporous fluids under pressure, the combination of a fluid actuated discharge valve; a pressure actuated shut-off valve; a member responsive to varying levels of condensate; and pilot valve mechanisms controlled by said member controlling said valves.

24. In combination with a steam separator for separating water from steam, a discharge valve, a valve chamber in which said valve is located, hydrostatic means for opening said valve, a spring for closing said valve, a controlling valve for controlling said means, and a diaphragm for actuating said controlling valve.

25. In combination with a steam separator for separating water from steam, a discharge valve, a valve chamber in which said valve is located, a discharge port for said chamber, a pressure admission port for said chamber, hydrostatic means for opening said valve, a spring for closing said valve, a controlling valve for controlling said hydrostatic means, and a diaphragm for actuating said controlling valve.

26. In combination with a steam separator for separating water from steam, a discharge valve, a valve chamber in which said valve is located, a discharge port for said chamber, a pressure admission port for said chamber, hydrostatic means for opening said valve, a spring for closing said valve, a controlling valve for controlling said pressure admission port and a diaphragm for actuating said controlling valve.

27. In combination with a steam separator for separating water from steam, a discharge valve, a valve chamber in which said valve is located, a discharge port for said chamber, a pressure admission port for said chamber, hydrostatic means for opening said valve, a spring for closing said valve, a controlling valve for controlling said pressure admission port, a diaphragm for actuating said controlling valve, and a spring for actuating said diaphragm to open said controlling valve.

28. In combination with a steam separator for separating water from steam, a discharge valve, a valve chamber in which said valve is located, a discharge port for said chamber, a pressure admission port for said chamber, hydrostatic means for opening said valve, a spring for closing said valve, a valve stem, a valve mounted in said stem, a diaphragm to which said valve is connected, and means permitting lost motion between said diaphragm and said valve stem.

29. In combination with a steam separator for separating water from steam, a piston discharge valve, a valve chamber in which said valve is located, hydrostatic means for opening said valve, a spring for closing said valve, a controlling valve for controlling said means, and a diaphragm for actuating said controlling valve.

30. In combination with a steam separator for separating water from steam, a separator chamber, a valve chamber, said valve chamber provided with an aperture leading to the interior of the separator chamber, and a valve in said valve chamber, said valve being opened by pressure upon the valve delivered through said aperture.

31. In combination with a steam separator for separating water from steam, a separator chamber, a valve chamber, said valve chamber provided with an aperture leading to the interior of the separator chamber, and a valve in said valve chamber, said valve provided with a sealing portion cooperating with the valve seat and with an actuating portion registering with the chamber opening whereby the pressure in the separator chamber acting upon the actuating portion opens said valve.

32. In a condensate controlling device for vaporous fluids under pressure, the combination of a diaphragm; means subjecting one side of said diaphragm to the fluid pressure and a varying head of condensate from said fluid to control the movement of the diaphragm, said means maintaining a liquid between the fluid and the diaphragm; means subjecting the other side of the diaphragm to the fluid pressure while maintaining a liquid between the fluid and the diaphragm and the pressure approximately constant relatively to said fluid pressure; and a control device actuated by the diaphragm.

33. In a condensate controlling device for vaporous fluids under pressure, the combination of a diaphragm; means subjecting one side of the diaphragm to the fluid pressure and a varying head of condensate from said fluid pressure to control the movement of the diaphragm, said means maintaining the liquid between the fluid and the diaphragm; means subjecting the other side of the diaphragm to the fluid pressure while maintaining a constant liquid contact and head on said diaphragm; and a controlling device actuated by the diaphragm.

In testimony whereof I have hereunto set my hand.

OSCAR H. LUDEMAN.